United States Patent [19]

Funaki et al.

[11] 4,332,859

[45] * Jun. 1, 1982

[54] COATED MATERIALS AND PRODUCTION THEREOF

[75] Inventors: Masaaki Funaki, Toyonaka; Motoaki Yoshida, Kawanishi; Yoshinori Shimauchi; Akira Fujioka, both of Osaka; Kazuo Sakiyama, Ibaraki, all of Japan

[73] Assignee: Sumitomo Chemical Company, Limited, Osaka, Japan

[*] Notice: The portion of the term of this patent subsequent to Dec. 30, 1997, has been disclaimed.

[21] Appl. No.: 119,773

[22] Filed: Feb. 8, 1980

Related U.S. Application Data

[63] Continuation of Ser. No. 943,813, Sep. 18, 1978, Pat. No. 4,242,412.

[30] Foreign Application Priority Data

Sep. 27, 1977 [JP] Japan ................. 52-116536

[51] Int. Cl.³ .............. B32B 27/36; B32B 17/10; B32B 27/42; B05D 3/02
[52] U.S. Cl. .................. 428/412; 427/164; 427/165; 427/393.4; 427/393.5; 427/407.2; 427/412.1; 428/442; 428/502; 428/507; 428/911
[58] Field of Search ........... 351/166; 65/60 R, 60 B; 428/412, 911, 426, 441, 442, 507, 502; 427/169-165, 393.5, 393.4, 407.2, 412.1; 264/1

[56] References Cited

U.S. PATENT DOCUMENTS

| | | | |
|---|---|---|---|
| 3,488,215 | 1/1970 | Shepherd et al. | 351/166 X |
| 3,867,175 | 2/1975 | Dornte | 427/164 X |
| 3,933,407 | 1/1976 | Tu et al. | 427/165 X |
| 4,052,520 | 10/1977 | Chang et al. | 351/166 X |
| 4,064,308 | 12/1977 | Laurin | 351/166 X |
| 4,082,894 | 4/1978 | Yoshida | 427/164 X |
| 4,127,682 | 11/1978 | Laurin | 427/164 |
| 4,164,602 | 8/1979 | Fabel | 428/412 X |
| 4,177,315 | 12/1978 | Ubersax | 428/412 X |
| 4,180,493 | 12/1979 | Selbeck et al. | 428/412 X |
| 4,191,804 | 3/1980 | Weber | 428/412 X |
| 4,242,412 | 12/1980 | Funaki et al. | 428/412 |

*Primary Examiner*—William J. Van Balen
*Attorney, Agent, or Firm*—Wenderoth, Lind & Ponack

[57] ABSTRACT

Coated formed materials of plastics or glass having improved anti-scratching and anti-fogging properties, are produced by applying to the surface of the formed material an undercoating material comprising (a) a mixture of methylolmelamine in which all or a part of the methylol groups are alkyletherified, and a polyhydric alcohol having a molecular weight of 1,500 or less which may contain an ethylene oxide or propylene oxide chain, or a pre-condensate thereof, (b) a mixture of a monomer having a unit of the formula (I),

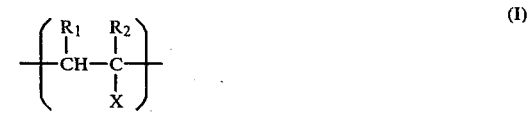

wherein $R_1$ and $R_2$ are independently a hydrogen atom or a lower alkyl, carboxyl or amino group and X is a hydroxyl group-containing side chain, or a homopolymer or copolymer thereof, and a crosslinking agent, or (c) a mixture of (a) and (b), followed by curing it so that the percentage of residual hydroxyl groups therein is from 60 to 90%, thereby forming a resin film (1), and then topcoating the resin film (1) with a topcoating material comprising a mixture of (d) a mixture of methylolmelamine in which all or a part of the methylol groups are alkyletherified, and a polyhydric alcohol having a molecular weight of 100 to 2,000 and an ethylene oxide chain, or a pre-condensate thereof and (e) a surface active agent, followed by curing it so that the percentage of residual hydroxyl groups therein is 35 to 70%, thereby forming a melamine resin film (2).

14 Claims, No Drawings

COATED MATERIALS AND PRODUCTION THEREOF

This is a continuation of application Ser. No. 943,813, filed Sept. 18, 1978 now U.S. Pat. No. 4,242,412.

The present invention relates to coated materials having both anti-scratching property and anti-fogging property, and to the production thereof.

Formed materials of plastics such as polycarbonate resins, cellulosic resins and the like are generally superior in impact resistance, and besides they are light in weight and superior in processability. Consequently, they are used for various purposes. These materials of plastics or glass, however, have the following drawbacks: The surface is easily scratched, and besides it is covered with fog and dew when its temperature is below the dew point of the ambient atmosphere.

For overcoming these drawbacks, the inventors previously proposed a method which comprises applying to the surface of a substrate such as plastics and glass a coating material containing a mixture of methylolmelamine in which all or a part of the methylol groups are alkyletherified and a polyhydric alcohol having a molecular weight of 100 to 2,000 and an ethylene oxide chain, or pre-condensate thereof, and curing it so that the percentage of residual hydroxyl groups is within the range of 35 to 70% thereby forming a surface film (Japanese Patent Publication (unexamined) No. 47431/1978). According to this method, both anti-scratching property and anti-fogging property are satisfied, but it is not always satisfactory in long-term retention of anti-fogging property. The anti-fogging property of the film made by this method results from absorption of water molecules by the film, and therefore the film continues to absorb water until it is saturated with water. When the amount of water vapor present is however beyond the absorption capacity of the film, an excess of water is condensed on the surface as droplets thereby generating fog, and besides transparency of the surface is largely damaged on account of fineness of the condensed water droplets. In order to prevent this phenomenon, improvement of anti-fogging ability by the increase of film thickness may also be thought of. But, retention of anti-fogging ability is limited for the reason described above, and besides absorbed water-containing portions swell and their appearance becomes poor.

The inventors extensively studied to find a method for producing coated materials of which the substrate is plastics or glass and which are improved in wetting and have both anti-scratching property and anti-fogging property and which generate no fog permanently or display anti-fogging ability for a long time.

As a result, it has been found that when a surface active agent is added to the mixture of methylolmelamine and a polyhydric alcohol, or the pre-condensate thereof as defined in said Japanese Patent Publication, the resulting melamine resin produces a surface film which is improved in wetting and extremely superior in retention of anti-fogging property, without losing anti-scratching property. At the same time, it has also been found that lowering of adhesion between the film and the substrate owing to the use of surface active agent can be sufficiently prevented by providing a particular resin film between said surface film and substrate.

The present invention thus provides a formed material of plastics or glass coated with a resin film (1) and a melamine resin film (2), the resin film (1) being formed on the surface of formed material by using (a) a mixture of methylolmelamine in which all or a part of the methylol groups are alkyletherified, and a polyhydric alcohol having a molecular weight of 1,500 or less which may contain an ethylene oxide or propylene oxide chain, or a pre-condensate thereof, (b) a mixture of a monomer having a unit of the formula (I),

(I)

wherein $R_1$ and $R_2$ are independently a hydrogen atom or a lower alkyl, carboxyl or amino group and X is a hydroxyl group-containing side chain, or a homopolymer or copolymer thereof, and a crosslinking agent, or (c) a mixture of (a) and (b), and the melamine resin film (2) being formed on the resin film (1) by using a mixture of (d) a mixture of methylolmelamine in which all or a part of the methylol groups are alkyletherified, and a polyhydric alcohol having a molecular weight of 100 to 2,000 and an ethylene oxide chain, or pre-condensate thereof, and (e) a surface active agent. This invention also provides a process for producing a formed material of plastics or glass having improved anti-scratching and anti-fogging properties, which comprises applying to the surface of the formed material an undercoating material (1) comprising (a) a mixture of methylolmelamine in which all or a part of the methylol groups are alkyletherified, and a polyhydric alcohol having a molecular weight of 1,500 or less which may contain an ethylene oxide or propylene oxide chain, or a pre-condensate thereof, (b) a mixture of a monomer having a unit of the formula (I),

(I)

wherein $R_1$ and $R_2$ are independently a hydrogen atom or a lower alkyl, carboxyl or amino group and X is a hydroxyl group-containing side chain, or a homopolymer or copolymer thereof, and a crosslinking agent, or (c) a mixture of (a) and (b), followed by curing it so that the percentage of residual hydroxyl groups therein is from 60 to 90%, thereby forming a resin film (1), and then topcoating the resin film (1) with a top-coating material (2) comprising a mixture of (d) a mixture of methylolmelamine in which all or a part of methylol groups are alkyletherified, and a polyhydric alcohol having a molecular weight of 100 to 2,000 and an ethylene oxide chain, or pre-condensate thereof and (e) a surface active agent, followed by curing it so that the percentage of residual hydroxyl groups therein is from 35 to 70%, thereby making a melamine resin film (2).

In the present invention, prior to the undercoating and topcoating, an undermost film (3) may be applied to the formed material by applying to the surface of the formed material an undermost coating material (3) comprising a polymer (A) having a unit of the formula (II),

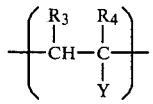
(II)

wherein $R_3$ and $R_4$ are independently a hydrogen atom or a lower alkyl or carboxyl group, and Y is a carboxyl or amino group-containing side chain, or a polymer (B) having both units of the formulae (III) and (IV),

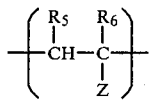
(III)

wherein $R_5$ and $R_6$ are independently a hydrogen atom or a lower alkyl or carboxyl group, and Z is a hydroxyl group-containing side chain, and

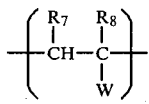
(IV)

wherein $R_7$ and $R_8$ are independently a hydrogen atom or a lower alkyl or carboxyl group, and W is a side chain having a carboxyl, amino, substituted amino, epoxy or tetrahydrofuryl group, followed by curing it.

Thus the coated material of the present invention is produced by optionally applying the coating material (3) and then the coating materials (1) and (2) in this order on the surface of the formed material of plastics or glass.

Methylolmelamine in which all or a part of the methylol groups are alkyletherified referred to herein means such a melamine compound that at least one hydrogen atom of three amino groups (NH$_2$—) connected to the triazine nucleus is substituted with a methylol group (—CH$_2$OH) and all or a part of the methylol groups are alkyletherified. The number of methylol groups can be varied with the required hardness and flexibility of the resin film, and it is generally 3 to 6, preferably 5 to 6. The degree of alkyletherification depends upon the kind of polyhydric alcohols, but it is desirable that most of the methylol groups are alkyletherified in order to avoid self-condensation prior to use. The alkyl moiety of the alkyletherified methylolmelamine may be a straight or branched chain having 1 to 6, preferably 1 to 3, carbon atoms. The alkyl moiety includes for example methyl, ethyl, n-propyl, isopropyl, n-butyl, isobutyl and tert-butyl. Specific examples of said methylolmelamine include hexakismethoxymethylmelamine, hexamethylolmelamine pentamethyl ether, hexamethylolmelamine tetramethyl ether, pentamethylolmelamine pentamethyl ether, pentamethylolmelamine tetramethyl ether, pentamethylolmelamine trimethyl ether, tetramethylolmelamine tetramethyl ether, tetramethylolmelamine trimethyl ether and trimethylolmelamine trimethyl ether. Of these, hexakismethoxymethylmelamine is most preferably used. These alkyletherified methylolmelamines may contain in part condensates thereof such as dimers connected through a —CH$_2$— or —CH$_2$—O—CH$_2$— linkage. Further, these alkyletherified methylolmelamines may be used alone or in combination.

Polyhydric alcohol having an ethylene oxide chain referred to herein and used for the mixture or the precondensate (d) means a compound having at least one

group in the molecule. The molecular weight of the ethylene oxide chain-containing polyhydric alcohol is generally 100 to 2,000, preferably 150 to 1,500, for the reason that, when the polyhydric alcohols have too large a molecular weight, reactivity of hydroxyl groups becomes so poor that curing is difficult and satisfactory film-forming property can not be obtained.

Typical examples of the ethylene oxide chain-containing polyhydric alcohol include diethylene glycol; triethylene glycol; polyethylene glycol having molecular weight of 200 to 500; ethylene oxide/diol (HOC$_n$H$_{2n}$OH, n=3 to 8) adducts having 1 to 7, preferably 1 to 5, ethylene oxide molecules at both ends of the diol; ethylene oxide/polyhydric alcohol adducts having 1 to 5, preferably 1 to 3, ethylene oxide molecules at the hydroxyl groups of the polyhydric alcohol (e.g. glycerin, trimethylolpropane, pentaerythritol, adonitol, sorbitol, inositol); and mixtures thereof.

When the content of the ethylene oxide chain-containing polyhydric alcohol in the mixture or the precondensate thereof (d) is too high, a polyhydric alcohol having a non-crosslinked ethylene oxide chain remains in the film thereby tending to lower the water resistance, solvent resistance and anti-scratching property of the film. When the methylolmelamine is too excessive, the curing thereof is largely inhibited or, if the curing is possible, flexibility of the film tends to be deteriorated.

Consequently, the equivalent ratio of the functional groups of the methylolmelamine to those of the polyhydric alcohol is limited to the range of 1:0.3-3, preferably 1:0.7-1.3.

The percentage of residual hydroxyl groups referred to herein means a weight ratio of hydroxyl groups remaining in the formed resin film (Y) to the total hydroxyl groups present in the polyhydric alcohol and methylolmelamine (X) (calculated value). The percentage is shown by the following equation: Residual hydroxyl group (%)=(Y/X)×100

A value calculated by X minus Y means the degree of reaction (condensation).

A higher percentage of residual hydroxyl groups in the melamine resin film (2) is desirable to elevate anti-fogging property, but percentages which are too high are not desirable since the curing thereof becomes insufficient thereby causing poor anti-scratching property, water resistance and solvent resistance. When the percentage is low, anti-scratching property, water resistance and solvent resistance become good but anti-fogging property becomes poor. Consequently, for obtaining the resin film having not only a practical anti-fogging ability but also anti-scratching property, anti-static property, water resistance and solvent resistance, the curing is conducted so that the percentage of residual hydroxyl groups is from 35 to 70%.

One of the important features of the present invention is to add a surface active agent to the said mixture or pre-condensate thereof (d). By incorporating the surface active agent in the melamine resin film (2) as topcoat, wetting of the film surface is improved and the anti-fogging property of the film can be retained for a long time. This may be considered as due to the following reasons.

Since the surface active agent is held in the network structure of the melamine resin film (2), the film becomes extremely hydrophilic and wettable with water. Further, since the agent is held firmly and stably in the net-work structure, it is hardly lost by repetition of absorption of water/drying cycles, thus retaining an anti-fogging effect for a long time. Thus, the resulting melamine resin film (2) having the wettability becomes very desirable without losing the anti-fogging property as well as water absorbency inherent in a resin film formed using only the mixture or the pre-condensate thereof (d).

When water vapor is continuously supplied to the surface of the melamine resin film (2), the film firstly absorbs water without damaging its transparency on account of its water absorbency. When water absorption reaches saturation, water vapor continuously supplied is necessarily condensed on the film and attached thereto, not in the form of discontinuous fine droplets, but in the form of a continuous water film by the action of the surface active agent. Once such water film is formed, water droplets are no longer formed from water vapor, and therefore fogging is not caused. Thus, a superior anti-fogging property is retained for a long time.

The surface active agent used for this purpose is not particularly limited, and well-known ones can be used. More preferably, however, those satisfying the following three requirements are used:

1. Soluble in the mixture or the pre-condensate thereof (d).
2. Neither cause problems such as irregularity of flow on the coating nor hindrance of crosslinking on the curing.
3. Do not cause harmful reaction and can be fixed to the net-work structure uniformly and stably by a strong bonding force.

Thus, the nonionic surface active agents are favorable. Among them, polyoxyethylene types are particularly effective.

Of the typical polyoxyethylene type surface active agents, those which give particularly desirable results are polyoxyethylene alkyl ether types of the formula, R—O(CH$_2$CH$_2$O)$_n$H, such as polyoxyethylene lauryl ether, polyoxyethylene alkylaryl ether types of the formula,

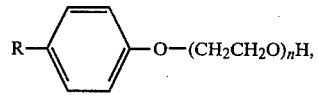

such as polyoxyethylene nonylphenyl ether, polyoxyethylene alkylamine types of the formulae,

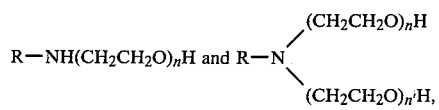

such as polyoxyethylene stearylamine, and polyoxyethylene alkylamide types of the formulae,

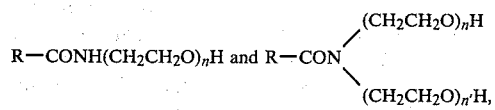

such as polyoxyethylene laurylamide. In the above formulae, R is a C$_6$–C$_{25}$ alkyl group and n and n' are an integer of 3 to 50, preferably 5 to 30.

The amount of surface active agent is determined on the basis of a balance between surface tension depressing ability and various properties and performances as anti-fogging film. Practically, the amount is determined depending upon the particular surface active agent, alkyletherified methylolmelamine and ethylene oxide chain-containing polyhydric alcohols. In the present invention, the amount of aforesaid surface active agent is generally 1 to 40% by weight, preferably 5 to 20% by weight, based on the mixture or the pre-condensate thereof (d).

When the amount is less than 1% by weight, the wetting effect is not exhibited, and besides the long-term retention of anti-fogging effect can not sufficiently be expected. An an amount of more than 40% by weight lowers crosslinking-curing thereby providing no resin film having superior anti-scratching property, water resistance and solvent resistance.

The coating material (2) contains, in addition to the above main component, a catalyst and if necessary a diluent for viscosity adjustment and a flow-controlling agent for smooth film formation.

As the catalyst, ammonium chloride, ammonium nitrate, ammonium thiocyanate, p-toluenesulfonic acid and the like may be used. The amount of the catalyst varies with the curing conditions, but generally it is 0.01 to 2% by weight based on the solid resin. As the diluent, for example ethanol, isopropanol, methyl cellosolve, ethyl cellosolve, butyl cellosolve, water and mixtures thereof are used.

The curing is generally carried out by baking. The baking temperature and baking time are controlled taking into account the percentage of residual hydroxyl groups in the resulting melamine resin film (2).

Baking conditions in which the percentage of residual hydroxyl groups can be made 35 to 70%, depend upon the composition of the coating material (2) and the kind and amount of the catalyst. Although higher baking temperatures are desirable in terms of the rate of curing, the curing is carried out favorably at a temperature between 50° C. and the heat distortion temperature of the material to be coated for ten minutes to 10 hours.

A too small thickness of the melamine resin film (2) does not exhibit the desired anti-fogging property, anti-static property and anti-scratching property. When the thickness is too large, adhesion between the melamine resin film (2) and the undercoat (the resin film (1)) and water resistance become poor. A preferred thickness is within the range of 5 to 30μ, preferably 10 to 15μ.

Next, explanation will be given of the resin film (1) to be applied under the resin film (2).

The resin film (1) is formed as undercoating on which the melamine resin film (2) is formed as topcoat by applying to the surface of the material of plastics or glass the coating material (1), and then curing it so that the percentage of residual hydroxyl groups therein is favorably from 60 to 90%.

When the percentage of residual hydroxyl groups is too low, that is, when the condensation or crosslinking overproceeds, reactivity between hydroxyl groups in the resin film (1) (which come from the polyhydric alcohols or the polymer having the unit of the formula (I)) and the alkyletherified methylolmelamine in the resin film (2) is lowered. As a result, strong adhesion can not be obtained, which results in peeling between the resin films (1) and (2) or shrinkage of the resin film (1). In the latter case, unevenness is formed on the surface of the film (1), and the film (2) can not be well coated thereon, thus forming no smooth topcoat.

When the percentage of residual hydroxyl groups is too high, that is, when progress of the condensation or crosslinking is insufficient, the resin film (1) is eroded, on account of its poor solvent resistance, by a solvent when topcoating material (2) is applied thereto. As a result, the erosion causes generation of cracks (termed "crazing") on the resin film (1).

For the reasons as described above, the percentage of residual hydroxyl groups is controlled to within the range of 60 to 90%.

When the melamine resin film (2) is formed on the formed resin film (1), the film (1) is additionally heat-treated on the curing of the melamine resin film (2), and as a result, the percentage of residual hydroxyl groups in the resin film (1) sometimes deviates from the range of 60 to 90% to less than 60%. In this case, however, adverse effects are no longer exerted on adhesion between the films and smoothness of the films.

The methylolmelamine used in the coating material (1) is the same as in the aforesaid topcoating material (2), and as the polyhydric alcohol the following compounds may be used. As polyhydric alcohols having no ethylene oxide or propylene oxide chain, there may be mentioned 1,3- or 1,2-propanediol, 1,2-, 1,3-, 1,4- or 2,3-butanediol, trimethylolpropane, glycerin, 1,6-hexanediol, 1,2- or 1,8-octanediol, 1,12-dodecanediol, pentaerythritol, adonitol, sorbitol and mixtures thereof. Among them, those having hydroxyl groups at both ends, for example 1,4-butanediol, 1,6-hexanediol, 1,8-octanediol and glycerin, are particularly preferred.

As polyhydric alcohols having an ethylene oxide or propylene oxide chain, there may be mentioned ethylene glycol; propylene glycol; diethylene glycol; dipropylene glycol; triethylene glycol; tripropylene glycol; polyethylene glycol having a molecular weight of 200 to 500; polypropylene glycol; ethylene- or propylene-oxide/diol ($HOC_nH_{2n}OH$, n=3 to 8) adducts having 1 to 7, preferably 1 to 5, ethylene- or propylene-oxide chains at both ends of the diol; ethylene- or propylene-oxide/alcohol adducts having 1 to 5, preferably 1 to 3, ethylene- or propylene-oxide chains, the alcohol including glycerin, trimethylolpropane, pentaerythritol, adonitol and sorbitol; and mixtures thereof. When the ethylene oxide or propylene oxide chain-containing polyhydric alcohols are of high molecular weight, reactivity of the hydroxyl groups is lowered so that the curing becomes difficult and satisfactory film-forming property can not be obtained. Consequently, the molecular weight of the said polyhydric alcohol is 100 to 1,500, preferably 150 to 1,200.

As to the weight ratio of the alkyletherified methylolmelamine to the polyhydric alcohol, it should be noted that when the polyhydric alcohol is used in too much excess, non-crosslinked polyhydric alcohol remains in the resin film (1), thereby causing reduction of the solvent resistance of the film (1) to erode the film (1) on the formation of the melamine resin film (2); while when the alkyletherified methylolmelamine is used in too much excess, the curing is much disturbed and the film (1) is likewise eroded by solvent on the formation of the melamine resin film (2).

For the reasons as described above, the equivalent ratio of the functional groups of the alkyletherified methylolmelamine to those of the polyhydric alcohol is within the range of generally 1:03-3, preferably 1:07-1.3.

In case where the mixture (b), i.e. a mixture of monomer having a unit of the formula (I) or a homopolymer or copolymer thereof and a crosslinking agent is used for forming the resin film (1), the following compounds are used as the monomer or polymer: Hydrophilic acrylates or methacrylates such as hydroxy lower alkyl acrylate, hydroxy lower alkyl methacrylate, hydroxy lower alkoxy lower alkyl acrylate and hydroxy lower alkoxy lower alkyl methacrylate; polymers thereof; polyvinyl alcohol; polyethylene oxide and the like. As preferred specific examples of the hydrophilic acrylate or methacrylate, there may be mentioned 2-hydroxyethyl acrylate, 2-hydroxyethyl methacrylate, diethylene glycol monoacrylate, diethylene glycol monomethacrylate, triethylene glycol monoacrylate, triethylene glycol monomethacrylate, 2-hydroxypropyl acrylate, 2-hydroxypropyl methacrylate, 3-hydroxypropyl acrylate, 3-hydroxypropyl methacrylate, dipropylene glycol monoacrylate, dipropylene glycol monomethacrylate and the like.

These monomers may be used in mixtures with other ethylenically unsaturated monomers, or copolymers therewith may also be used.

As the ethylenically unsaturated monomers, there may be mentioned lower alkyl acrylates or methacrylates such as methyl acrylate, ethyl acrylate, isopropyl acrylate, butyl acrylate, methyl methacrylate, ethyl methacrylate, isopropyl methacrylate, and butyl methacrylate, acrylic acid, methacrylic acid, itaconic acid, maleic acid, fumaric acid, acrylamide, methacrylamide, methylolacrylamide and the like. When a mixture of the monomer having the unit of the formula (I) and the other ethylenically unsaturated monomer, or the copolymer thereof is used, a preferred amount of the former monomer is 60% by weight or more based on the mixture, because when the ethylenically unsaturated monomer is used in excess, it tends to disturb condensation with the methylolmelamine present in the melamine resin film (2) thereby lowering adhesion.

As the crosslinking agent, phthalic anhydride, succinic acid, trimellitic acid, pyromellitic acid, quinolinecarboxylic acid, naphthalic acid, epoxy resins and the like may be used. In addition, partially methylated hexamethylolmelamines such as hexakismethoxymethylmelamine, hexamethylolmelamine pentamethyl ether and the like are desirable since they strengthen adhesion between the resin film (1) and the material of plastics or glass.

When the mixture (c) of the mixture or pre-condensate thereof (a) and the mixture (b) is used, the blending ratio of (a) to (b) is optional. In this case, however, as the polymer having the unit of the formula (I) or the copolymer thereof with the ethylenically unsaturated monomer, polymers or copolymers having a molecular weight of 5,000 to 50,000 are desirable in terms of compatibility.

In the present invention, any of the materials (a), (b) and (c) may be used, and the selection may be made depending upon the kind of the formed material to be covered a d purpose of use. For example, when the formed material is of polycarbonate plastics of diethylene glycol bisallylcarbonate type or glass, the mixture (b) or (c) is selected to obtain a strong adhesive force of the film, and the mixture (c) is selected to increase the hardness of film. When the formed material is cellulosic plastics, the material (a) is preferably used to obtain a strong adhesive force of the film.

The resin film (1) of the present invention may be formed by coating the surface of the formed material with the undercoating material (1) comprising the mixture (a), (b) or (c), followed by curing. In this case, coating material (1) may contain, in addition to the above main component, a catalyst for curing and if necessary a diluent, a flow-controlling agent and a crosslinking agent.

The catalyst, diluent and flow-controlling agent used herein may be the same as used in making the resin film (2).

The amount of the crosslinking agent used is 0.05 to 0.7 equivalent, preferably 0.2 to 0.4 equivalent, per equivalent of hydroxyl groups in the monomer of the formula (I) or polymer thereof.

The curing may be carried out in the same manner as described for the formation of the resin film (2) except that it is controlled so that the percentage of residual hydroxyl groups is within the range of 60 to 90%.

When the thickness of the resin film (1) is too small, adhesion between the film (1) and the substrate is not sufficient since the surface active agent in the film (2) passes through the film (1) to reach the substrate. Too large a thickness lowers water resistance. A preferred thickness of the film (1) is 1.5 to 10$\mu$, preferably 3 to 5$\mu$.

As the formed material, there may be mentioned formed plastic materials for example of transparent or opaque plastics such as cellulosic plastics, polycarbonate plastics including diethylene glycol bisallylcarbonate, polyacryl plastics, polyvinyl chloride plastics and polyester plastics, and glass.

In order to increase the adhesive force between the formed material and the resin film, it is also effective to previously apply an undercoating treatment to the formed material to form a resin film (3) thereon, followed by formation of the resin films (1) and (2) in this order. This method is particularly effective when polycarbonate plastics of bisphenol A type are used as the formed material.

This undermost resin film (3) is obtained by coating the surface of the substrate or formed material with the undermost coating material (3), followed by curing.

The polymer (A) for coating material (3) preferably contains at least 5 mole % of the repeating structural unit of the formula (II), and the polymer (B) preferably contains at least 2.5 mole % each of the repeating structural units of the formulae (III) and (IV), respectively.

A preferred polymer (A) can easily be produced by polymerizing vinyl monomers alone described below or by copolymerizing the vinyl monomers and other monomers copolymerizable therewith. The vinyl monomers include acrylic acid, methacrylic acid, crotonic acid, vinylacetic acid, maleic acid, itaconic acid, acrylamide, methacrylamide, crotonamide and the like. These vinyl monomers may be used alone or in combination.

A preferred polymer (B) can be produced by copolymerizing the following vinyl monomers (C) and vinyl monomers (D) and if necessary other monomers copolymerizable therewith. The vinyl monomers (C) include N-hydroxymethylacrylamide, N-hydroxymethylmethacrylamide, N-(2-hydroxyethyl)acrylamide, N-methylacrylamide, N-methylmethacrylamide, N-ethylacrylamide, N-ethylmethacrylamide, 2-hydroxyethyl acrylate, 2-hydroxyethyl methacrylate, polyethylene glycol monoacrylate, polypropylene glycol monomethacrylate, hydroxymethylaminomethyl acrylate, hydroxymethylaminomethyl methacrylate and the like. These vinyl monomers (C) may be used alone or in combination.

The vinyl monomers (D) include acrylic acid, methacrylic acid, crotonic acid, vinylacetic acid, maleic acid, itaconic acid; acrylamide, methacrylamide, propyl methacrylate; acryl glycidyl ether, allyl glycidyl ether, glycidyl acrylate, glycidyl methacrylate, glycidyl crotonate; tetrahydrofurfuryl acrylate, tetrahydrofurfuryl methacrylate and the like. These vinyl monomers (D) may be used alone or in combination.

Undermost coat (the resin film (3)) is obtained by applying to the surface of the formed material of plastics or glass the coating material (3) comprising the polymer (A) or (B) as main component and if necessary a crosslinking agent and a crosslinking catalyst, drying it and if necessary baking it at temperature lower than the heat distortion temperature of the plastics or glass. A preferred thickness of the film (3) is 0.1 to 0.5$\mu$. By providing this undermost resin film, hydroxyl, carboxyl or amino groups in said resin film react with methylolmelamine or a crosslinking agent contained in the resin film (1) to be subsequently applied, whereby the resin film (1) is firmly attached to the substrate through the resin film (3). When the substrate is polyacryl plastics or glass, a silicone resin film may be formed in place of the resin film (3), or the substrate may be covered with a silane coupling agent.

Thus, the coated materials obtained by the present invention have the following characteristics: The surface of a transparent or opaque article of plastics or glass is improved in wetting; and resin films which are firmly attached to the substrate are superior not only in anti-scratching property and anti-fogging property but also in anti-static property.

The coated materials obtained by the present invention are used as transparent or opaque materials with plastics or glass as substrate which need to have anti-fogging property or anti-static property, for example, protecting means such as lens for glasses, sunglasses or industrial protecting glasses and face shields; windshields for airplanes, helicopters, motor boats, snow mobiles, motorbikes, automobiles and other vehicles; glazings for houses, offices, schools, factories, shops, churches, gymnasiums and other buildings; mirrors; reflecting means; instrument boards; dust covers and the like.

The present invention will be illustrated specifically with reference to the following examples.

In the examples, pencil hardness and falling abrasive grain hardness were measured according to JIS K 5400 and JIS T 8147, respectively. Adhesive property was measured and indicated as follows: Film surface was cut with a knife to make 11 cut lines, which were parallel to and 1 mm apart from one another, in the lengthwise and crosswise directions each, and thus 100 squares were formed; cellophane adhesive tape was stuck to the squares and torn off; and the adhesive property was indicated by the number of untorn squares among 100 squares. Water resistance was measured as follows: Test samples were exposed to water vapor of 70° C. for 2 hours and the surface of the sample was visually examined for the presence or absence of abnormality. Wetting was measured as follows: Test samples previously kept at −10° C. were taken out into room temperature of 25° C., and breathed upon, and generation of fog was visually examined. Wetting was expressed quantitatively by measuring the contact angle of each test sample. The percentage of residual hydroxyl groups in the resin films (1) and (2) was measured as follows: The films were baked separately in the respective same conditions as in the examples, and well dried; residual hydroxyl groups in the baked films were measured by infrared absorption spectrum; and the weight ratio of the residual hydroxyl groups to the total hydroxyl groups in the polyhydric alcohol, vinyl compound, surface active agent and melamine resin was calculated for each film. Anti-static property was measured and evaluated as follows: Test samples were allowed to stand overnight in an air-conditioned room of 20° C. and 45% relative humidity; the samples were charged by means of Static Honestometer (produced by Shishido & Co. Ltd.), and decay of voltage was observed at fixed temperature and humidity; the anti-static effect was evaluated by the time it took for the voltage to be reduced to one-half its initial value (half-life period) and the time it took for the voltage to be reduced 100% (Temporary conditions of measurement: Applied voltage 6 KV; charging time 30 seconds).

EXAMPLE 1

Nitrogen was filled in a four-necked flask equipped with a stirrer, a thermometer, a nitrogen-introducing tube and a reflux condenser. Thereafter, 320 g of ethyl cellosolve, 36 g of 2-hydroxyethyl methacrylate, 14 g of dimethylaminoethyl methacrylate, 50 g of methyl methacrylate and 0.4 g of azoisobutyronitrile were added to the flask. The mixture was heated to 90° C. with mild stirring and continued to stir for about 4 hours while blowing nitrogen gas into the flask constantly. The mixture in the flask turned into a pale yellow, transparent liquid having a viscosity of about 100 cp. Thus, a copolymer of 2-hydroxyethyl methacrylate, dimethylaminoethyl methacrylate and methyl methacrylate was prepared. A coating material for undermost coat was prepared by adding 0.4 g of hexakismethoxymethylmelamine, 0.057 g of ammonium chloride, 900 g of ethyl cellosolve and a small amount of a flow-controlling agent to 100 g of the above liquid. This coating material was coated on the surface of a formed article of bisphenol A type polycarbonate resin and baked (hardened) at 130° C. for 15 minutes to obtain an undermost coat (resin film (3)) of about 0.3μ in thickness. The surface of this film was coated with a coating material produced by dissolving 65 g of hexakismethoxymethylmelamine and 40.5 g of 1,4-butanediol in 40 g of ethyl cellosolve and adding 0.2 g of ammonium thiocyanate as catalyst to the resulting solution. The coating was then baked at 80° C. for 20 minutes to obtain a resin film (1) (undercoat) of about 4μ in thickness. The percentage of residual hydroxyl groups in the film (1) was 79%. The surface of this film (1) was further coated with a coating material produced by dissolving 65 g of hexakismethoxymethylmelamine, 141 g of polyoxyethylated sorbitol having a molecular weight of 850, 0.824 g of ammonium nitrate and 20 g of polyoxyethylene alkyl ether type surface active agent (Adekanol LO-7, produced by Asahi Denka Co.) in a mixed solvent of 75 g of butyl cellosolve and 50 g of water. The coating was then baked at 130° C. for 60 minutes to obtain a resin film (2) (topcoat) of about 13μ in thickness. The percentage of residual hydroxyl groups in the topcoat was 48%. As is shown in Table 2, the film thus obtained was superior not only in wetting, anti-fogging property, anti-static property and adhesive force, but also in anti-scratching property and water resistance.

In order to examine the effect of the percentage of residual hydroxyl groups in the resin film (1) (undercoat) on adhesive force on the film (2), coated materials were obtained under the same conditions as above except that the baking temperature and baking time were varied.

Adhesive forces obtained under respective conditions were as shown in Table 1.

TABLE 1

| No. | Baking temperature (°C.) | Baking time (min.) | Percentage of residual hydroxyl groups in resin film (1) (%) | Adhesive force on film (2) |
|---|---|---|---|---|
| 1 | 80 | 20 | 79 | 100/100 |
| 2 | 80 | 30 | 76 | 100/100 |
| 3 | 80 | 60 | 71 | 100/100 |
| 4 | 80 | 10 | 93 | Not measurable |
| 5 | 100 | 30 | 58 | 74/100 |
| 6 | 100 | 60 | 47 | 17/100 |
| 7 | 130 | 30 | 44 | 0/100 |
| 8 | 130 | 60 | 41 | 0/100 |

In the case of sample No. 4, the film-forming property of the resin film (1) was not sufficient so that the film (1) was eroded by solvent on formation of resin film (2). Consequently, adhesive force on the film (2) could not be measured.

EXAMPLE 2

Plastic plate made of bisphenol A type polycarbonate was coated with the same coating material for undermost coat as in Example 1 to make a resin film (3) (undermost coat). The plate was then coated with a coating material for undercoat prepared by dissolving 50 g of diethylene glycol monomethacrylate polymer in 277 g of methyl cellosolve and adding 2.0 g of hexakismethoxymethylmelamine as crosslinking agent and 0.05 g of ammonium chloride as catalyst to the resulting solution. The coating was baked at 100° C. for 30 minutes to make a resin film (1) (undercoat). The percentage of residual hydroxyl groups in the film (1) was 82%. On the film (1) was coated a coating material prepared by dissolving 65 g of hexakismethoxymethylmelamine, 141 g of polyoxyethylated sorbitol having a molecular weight of 850, 0.824 g of ammonium nitrate and 20 g of polyoxyethylene alkyl ether type surface active agent (Adekanol LO-12, produced by Asahi Denka Co.) in a mixed solvent of 75 g of butyl cellosolve and 50 g of water. The coating was then baked at 130° C. for 60 minutes to make a resin film (2) (topcoat). The percentage of residual hydroxyl groups in the film (2) was 49%. As is shown in Table 2, the film thus obtained had a small contact angle and superior wetting, anti-fogging property, anti-static property and anti-scratching property, and besides the film was firmly attached to the substrate.

For comparison, a coated material was prepared using no surface active agent as follows.

COMPARATIVE EXAMPLE 1

Plastic plate made of bisphenol A type polycarbonate, to which the same undermost coating treatment as above was applied, was coated with a coating material prepared by dissolving 65 g of hexakismethoxymethylmelamine, 141 g of polyoxyethylated sorbitol having a molecular weight of 850 and 0.824 g of ammonium nitrate in a mixed solvent of 75 g of butyl cellosolve and 50 g of water, followed by baking at 130° C. for 60 minutes. As is shown in Table 2, the film thus obtained was superior in anti-scratching property and water resistance, but its contact angle was so large that very fine water droplets were formed on the surface and the so-called fog was generated in the wetting test.

EXAMPLE 3

Plastic plate made of bisphenol A type polycarbonate was coated with the same coating material for undermost coat as in Example 1 to make a resin film (3) (undermost coat). One hundred grams of a prepolymer obtained by reacting 55 g of hexakismethoxymethylmelamine and 49 g of 1,6-hexanediol was dissolved in 40 g of ethyl cellosolve, and 0.4 g of ammonium chloride as catalyst was added thereto to obtain a coating material for resin film (1). This coating material was applied on the resin film (3) and baked at 80° C. for 30 minutes to make a resin film (1) (undercoat). The percentage of residual hydroxyl groups in the film (1) was 76%. Thereafter, a coating material for topcoat prepared as described below was applied on the film (1) and baked at 130° C. for 60 minutes to make the resin film (2) (topcoat): A mixture of 520 g of hexakismethoxymethylmelamine, 800 g of polyethylene glycol having a molecular weight of 200 and 0.4 ml of 85% phosphoric acid was reacted until the amount of a distillate at 130° to 140° C. reached 86 g; 70 g of the pre-condensate thus obtained was dissolved in a mixed solvent of 12 g of butyl cellosolve and 8 g of water; and 0.14 g of ammonium nitrate and 7 g of polyoxyethylene alkylamide type surface active agent (Ethomid O-15, produced by Lion Yushi Co.) were added to the resulting solution to obtain the coating material. The percentage of residual hydroxyl groups in the film (2) was 51%. The film thus obtained was superior in wetting, anti-fogging property, anti-static property, anti-scratching property and water resistance, and besides the film was firmly attached to the substrate.

EXAMPLE 4

Plastic plate made of bisphenol A type polycarbonate was coated with the same coating material for undermost coat as in Example 1 to make a resin film (3) (undermost coat). Thereafter, a coating material prepared as described below was applied on the plastic plate and baked at 80° C. for 30 minutes to make a resin film (1) (undercoat): Sixty grams of a prepolymer obtained by reacting 67 g of hexakismethoxymethylmelamine and 53 g of diethylene glycol, and 50 g of a copolymer comprising 2-hydroxyethyl methacrylate and methyl methacrylate in a weight ratio of 80:20 were dissolved in 320 g of ethyl cellosolve; and 0.3 g of ammonium thiocyanate as catalyst was added to the resulting solution to obtain the objective coating material. The percentage of residual hydroxyl groups in the film (1) was 81%. Thereafter, a coating material for topcoat prepared as described below was applied on the film (1) and baked at 130° C. for 60 minutes to make a resin film (2) (topcoat): A mixture of 480 g of hexakismethoxymethylmelamine, 570 g of polyoxyethylated glycerin having a molecular weight of 224 and 0.39 ml of 85% phosphoric acid was reacted until the amount of a distillate at 140° to 147° C. reached 57.6 g; 50 g of the pre-condensate thus obtained was dissolved in a mixed solvent of 14.6 g of butyl cellosolve and 11.0 g of water; and 0.194 g of ammonium nitrate and 5 g of polyoxyalkylaryl ether type surface active agent (Emulgen 910, produced by Kao Sekken Co.) were added to the resulting solution to obtain the objective coating material. The percentage of residual hydroxyl groups in the film (2) was 47%. Wetting, anti-fogging property, anti-static property, anti-scratching property and water resistance of the film obtained were as shown in Table 2.

COMPARATIVE EXAMPLE 2

For comparison, a coated material was prepared in the same manner as in Example 4 except that the resin film (1) was not applied. As is shown in Table 2, the results showed that adhesive force was weakened since the surface active agent migrated to the substrate surface.

EXAMPLE 5

Plastic plate made of bisphenol A type polycarbonate was coated with the same coating material for undermost coat as in Example 1. On the surface of the film was applied a coating material prepared by dissolving 12 g of 2-hydroxyethyl methacrylate polymer (molecular weight about 40,000) in 35 g of ethyl cellosolve and adding 0.9 g of hexamethoxymethylmelamine as crosslinking agent and 0.02 g of ammonium chloride as catalyst to the resulting solution. The film was then baked at 80° C. for 25 minutes to make a resin film (1). The percentage of residual hydroxyl groups in the film (1) was 84%. Separately from this, to a 1-liter four-necked flask with a stirrer, a thermometer and a condenser for distilling out methanol and water were added 188 g of hexamethylolmelamine pentamethyl ether, 319 g of polyoxyethylated sorbitol (average molecular weight 850) and 0.225 ml of 85% phosphoric acid. The mixture in the flask was reacted in the atmosphere until the amount of a distillate at 147° to 151° C. reached 10.5 g. After cooling to 90° C., 68.6 g of butyl cellosolve and 45.7 g of ion-exchanged water were added to the reaction mixture to obtain a slightly yellow, transparent liquid resin having a viscosity of $Z_3$ to $Z_4$ at 25° C. (Gardner-Holdt boubble viscometer). A mixture of 20 g of this liquid resin, 0.6 g of ammonium nitrate and 1.6 g of polyoxyethylene alkyl ether type surface active agent (Adekatol SO-120, produced by Asahi Denka Co.) was dissolved in a mixed solvent of 6 g of butyl cellosolve and 4 g of water to obtain a coating material for topcoat. This coating material was applied on the resin film (1) and baked at 130° C. for 40 minutes to obtain a resin film (2). The percentage of residual hydroxyl groups in the film (2) was 53%. As is shown in Table 2, the film thus obtained was superior in wetting, anti-static property, anti-scratching property and water resistance, and besides it was firmly attached to the substrate.

EXAMPLE 6

A coating material for undercoat was prepared by dissolving 50 g of 2-hydroxyethyl methacrylate polymer, 40 g of hexakismethoxyethylmelamine and 27 g of 1,4-butanediol in 60 g of ethyl cellosolve and adding 0.2 g of ammonium chloride as catalyst to the resulting solution. This coating material was applied on plastic plate made of diethylene glycol bisallyl ether type polycarbonate and baked at 80° C. for 30 minutes to make an undercoat. The percentage of residual hydroxyl groups in the undercoat was 80%. Thereafter, on the surface of the undercoat film thus made was applied a coating material prepared by dissolving 43.3 g of hexakismethoxymethylmelamine, 94 g of polyoxyethylated sorbitol having a molecular weight of 850, 0.55 g of ammonium nitrate, 6.3 g of polyoxyethylene alkyl ether type surface active agent (Adekanol LO-9, produced by Asahi Denka Co.) and 7 g of polyoxyethylene alkylamide type surface active agent (Ethomid O-15, produced by Lion Yushi Co.) in a mixed solvent of 50 g of butyl cellosolve and 33.4 g of water. The coating was baked at 120° C. for 3 hours to obtain a resin film (2) (topcoat). The percentage of residual hydroxyl groups in the film (2) was 49%. As is shown in Table 2, the film thus obtained was superior in wetting, anti-fogging property, anti-static property and anti-scratching property, and besides it was firmly attached to the substrate.

EXAMPLE 7

Nitrogen was filled in a four-necked flask equipped with a stirrer, a thermometer, a nitrogen-introducing tube and a reflux condenser. Thereafter, 200 g of ethyl cellosolve, 74 g of 2-hydroxyethyl methacrylate, 32 g of itaconic acid and 0.5 g of azoisobutyronitrile were added to the flask. The mixture was heated to 90° C. with mild stirring and continued to stir for about 5 hours while blowing nitrogen gas into the flask constantly. The mixture in the flask turned into a yellow, transparent liquid having a viscosity of about 250 cps. Thus, a copolymer of 2-hydroxyethyl methacrylate and itaconic acid was obtained. A coating material for undercoat was prepared by adding 1.2 g of hexakismethoxymethylmelamine as crosslinking agent, 0.03 g of ammonium chloride as catalyst, 300 g of ethyl cellosolve and a small amount of a flow-controlling agent to 100 g of the above liquid. This coating material was applied on plastic plate made of diethylene glycol bisallyl ether type polycarbonate and baked at 100° C. for 30 minutes to make an undercoat. The percentage of residual hydroxyl groups in the undercoat was 80%. Thereafter, on the surface of this undercoat film was applied a coating material prepared as described below and baked at 120° C. for 3 hours to make a topcoat: 97.5 g of hexakismethoxymethylmelamine and 150 g of polyethylene glycol having a molecular weight of 200 were condensed; and to 206 g of a pre-polymer thus obtained were added 0.824 g of ammonium nitrate and 20 g of polyoxyethylene alkylamide type surface active agent (Ethomid O-15, produced by Lion Yushi Co.) to obtain the objective coating material. The percentage of residual hydroxyl groups in the topcoat was 48%. As is shown in Table 2, the film thus obtained was superior not only in wetting, anti-fogging property anti-static property and adhesive force but also in anti-scratching property and water resistance.

EXAMPLE 8

Cellulose acetate type plastic sheet was dipped in 10% aqueous sodium hydroxide solution at 25° C. for 3 minutes and washed with distilled water, followed by forced air-drying. The plastic sheet was coated with a coating material prepared by dissolving 390 g of hexakismethoxymethylmelamine and 500 g of polyoxypropylated glycerin having a molecular weight of 250 in a mixed solvent of 200 g of butyl cellosolve and 120 g of water, and adding 2.6 g of ammonium chloride as catalyst to the resulting solution. The coating was baked at 80° C. for 20 minutes to make an undercoat. The percentage of residual hydroxyl groups in the undercoat was 78%. Separately from this, to a 1-liter four-necked flask equipped with a stirrer, a theromometer and a condenser for distilling out methanol and water were added 184 g of hexakismethoxymethylmelamine, 282 g of polyoxyethylated sorbitol (average molecular weight 450) and 0.2 ml of 85% phosphoric acid. The mixture in the flask was reacted in the atmosphere until the amount of a distillate at 129° C. to 130° C. reached 11.4 g. Thus, a yellow viscous liquor having a viscosity of more than $Z_{10}$ at 25° C. (Gardner-Holdt bubble viscometer) was obtained. Thereafter, 20 g of this liquid resin was dissolved in a mixed solvent of 10 g of butyl cellosolve and 6 g of water, and 0.07 g of ammonium nitrate and 2 g of polyoxyethylene alkylaryl ether type surface active agent (Adekanol PC-8, produced by Asahi Denka Co.) were added thereto to obtain a coating material for topcoat. This coating material was applied on the undercoat and baked at 80° C. for 60 minutes to make a topcoat. The percentage of residual hydroxyl groups in the topcoat was 52%. As is shown in Table 2, the film thus obtained was superior in wetting, anti-static property, anti-scratching property and water resistance, and besides it was firmly attached to the substrate.

EXAMPLE 9

Glass plate of 3 mm in thickness was pre-treated by dipping it in a pre-treatment liquor prepared by dissolving 5 g of silane coupling agent (Silicone SH 6040 (glycidoxypropyl trimethoxysilane); produced by Toray Silicone Co.) in a mixed solvent of 90 g of ethanol and 100 g of water, followed by baking at 130° C. for 10 minutes. A coating material prepared as described below was applied on the glass plate and baked at 100° C. for 20 minutes to make a resin film (1) (undercoat): 195 g of hexakismethoxymethylmelamine and 135 g of 1,4-butanediol were reacted to obtain a pre-polymer; 130 g of the pre-polymer and 100 g of 2-hydroxyethyl methacrylate polymer were dissolved in 680 g of ethyl cellosolve; and 0.4 g of ammonium thiocyanate as catalyst was added to the solution to obtain the objective coating material. The percentage of residual hydroxy groups in the undercoat was 68%. Thereafter, a coating material for topcoat prepared as described below was applied on the undercoat and baked at 130° C. for 50 minutes to make a topcoat: 390 g of hexakismethoxymethylmelamine and 850 g of polyoxyethylated sorbitol having a molecular weight of 850 were condensed; 600 g of the pre-polymer thus obtained was dissolved in a mixed solvent of 120 g of butyl cellosolve and 80 g of water; and 2.4 g of ammonium nitrate as catalyst and 55 g of polyoxyethylene alkylamide type surface active agent (Ethomid O-15, produced by Lion Yushi Co.) were added to the resulting solution to obtain the objective coating material. The percentage of residual hydroxyl groups in the topcoat was 45%. As is shown in Table 2, the film thus obtained was superior not only in wetting, anti-fogging property, anti-static property and adhesive property, but also in anti-scratching property and water resistance.

TABLE 2

Hardness

TABLE 2-continued

| Substrate | | Pencil hardness | Falling abrasive grain hardness | Adhesive property | Water resistance |
|---|---|---|---|---|---|
| Polycarbonate: | Untreated | H | 37% | — | — |
| | Example 1 | 5 H | 2% | 100/100 | No abnormality |
| | Example 2 | 5 H | 2% | 100/100 | No abnormality |
| Bisphenol A type | Comparative Example 1 | 5 H | 2% | 100/100 | No abnormality |
| | Example 3 | 5 H | 3% | 100/100 | No abnormality |
| | Example 4 | 5 H | 2% | 100/100 | No abnormality |
| | Comparative Example 2 | 5 H | 2% | 0/100 | Peeling |
| | Example 5 | 5 H | 2% | 100/100 | No abnormality |
| Ether type* | Untreated | 4–5 H | 5% | — | — |
| | Example 6 | 5 H | 3% | 100/100 | No abnormality |
| | Example 7 | 4–5 H | 3% | 100/100 | No abnormality |
| Cellulose acetate | Untreated | H-2 H | 23% | — | — |
| | Example 8 | 4–5 H | 3% | 100/100 | No abnormality |
| Glass | Untreated | — | 7% | — | — |
| | Example 9 | 4 H | 3% | 100/100 | No abnormality |

| Substrate | | Contact angle | Breathing test | Anti-static property | |
|---|---|---|---|---|---|
| | | | | Half-life period (sec.) | 100% decay (sec.) |
| Polycarbonate: | Untreated | 48° | Foggy | ∞ | ∞ |
| | Example 1 | 15° | No fog | 3 | 12 |
| | Example 2 | 5° | No fog | 2 | 10 |
| Bisphenol A type | Comparative Example 1 | 70° | Foggy | 4 | 14 |
| | Example 3 | 14° | No fog | 3 | 12 |
| | Example 4 | 5° | No fog | 3 | 12 |
| | Comparative Example 2 | 4° | No fog | 3 | 12 |
| | Example 5 | 4° | No fog | 3 | 11 |
| Ether type* | Untreated | 51° | Foggy | ∞ | ∞ |
| | Example 6 | 4° | No fog | 3 | 12 |
| | Example 7 | 5° | No fog | 3 | 11 |
| Cellulose acetate | Untreated | 32° | Foggy | 7 min. | ∞ |
| | Example 8 | 4° | No fog | 3 | 11 |
| Glass | Untreated | 16° | Foggy | 20 | 7 min. |
| | Example 9 | 4° | No fog | 3 | 12 |

*Ether type: Diethylene glycol bisallyl ether type.

What is claimed is:

1. A formed material of plastics of glass coated with a resin film (1) and a melamine resin film (2), the resin film (1) being formed on the surface of the formed material by using (a) a mixture of methylolmelamine in which all or a part of the methylol groups are alkyletherified, and a polyhydric alcohol having a molecular weight of 1,500 or less which may contain an ethylene oxide or propylene oxide chain, or a pre-condensate thereof, (b) a mixture of a monomer having a unit of the formula (I),

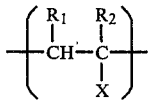

wherein $R_1$ and $R_2$ are independently a hydrogen atom or a lower alkyl, carboxyl or amino group and X is a hydroxyl group-containing side chain, or a homopolymer or copolymer thereof, and a crosslinking agent, or (c) a mixture of (a) and (b), and the melamine resin film (2) being formed on the resin film (1) by using (d) a mixture of methylolmelamine in which all or a part of the methylol groups are alkyletherified, and a polyhydric alcohol having a molecular weight of 100 to 2,000 and an ethylene oxide chain, or a pre-condensate thereof, and (e) a surface active agent.

2. The material according to claim 1, wherein the plastics are polycarbonate resins.

3. The material according to claim 2, wherein the resin film (1) is formed by using the mixture (b) or (c).

4. The material according to claim 1, wherein the plastics are cellulosic resins.

5. The material according to claim 4, wherein the resin film (1) is formed by using the mixture of the pre-condensate thereof (a).

6. The material according to claim 1, wherein the equivalent ratio of the functional groups of the methylolmelamine to the functional groups of the polyhydric alcohol in the mixture or the pre-condensate (d) is 1:0.3 to 3.

7. The material according to claim 1, wherein the equivalent ratio of the functional groups of the methylolmelamine to the functional group of the polyhydric alcohol in the mixture or the pre-condensate (a) is 1:0.3 to 3.

8. The material according to claim 1, wherein the surface active agent (e) is used in an amount of 1 to 40% by weight based on the weight of the mixture or the pre-condensate (d).

9. The material according to claim 1, wherein the surface active agent is a nonionic surface active agent.

10. The material according to claim 1, wherein the surface active agent is a polyoxyethylene type surface active agent.

11. The material according to claim 1, wherein the melamine resin film (2) is formed by adding the surface active agent (e) to the mixture or the pre-condensate (d) and curing the resultant mixture so that the percentage of residual hydroxyl groups therein is from 35 to 70%.

12. A process for producing a formed material of plastics or glass having improved anti-scratching and anti-fogging properties, which comprises applying to the surface of the formed material an undercoating material comprising (a) a mixture of methylolmelamine in which all or a part of the methylol groups are alkyletherified, and a polyhydric alcohol having a molecular weight of 1,500 or less which may contain an ethylene oxide or propylene oxide chain, or a pre-condensate thereof, (b) a mixture of a monomer having a unit of the formula (I),

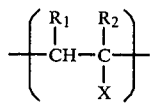

wherein $R_1$ and $R_2$ are independently a hydrogen atom or a lower alkyl, carboxyl or amino group and X is a hydroxyl group-containing side chain, or a homopolymer or copolymer thereof, and a crosslinking agent, or (c) a mixture of (a) and (b), curing the undercoating material so that the percentage of residual hydroxyl groups therein is from 60 to 90%, thereby forming a resin film (1), topcoating the resin film (1) with a topcoating material comprising a mixture of (d) a mixture of methylolmelamine in which all or a part of the methylol groups are alkyletherified, and a polyhydric alcohol having a molecular weight of 100 to 2,000 and an ethylene oxide chain, or a pre-condensate thereof and (e) a surface active agent, and curing the topcoating material so that the percentage of residual hydroxyl groups therein is from 35 to 70%, thereby forming a melamine resin film (2).

13. The material according to claim 1, wherein the polyhydric alcohol having a molecular weight of 100 to 2,000 and an ethylene oxide chain is diethylene glycol; triethylene glycol; polyethylene glycol having a molecular weight of 200 to 500; an ethylene oxide/diol ($HOC_nH_{2n}OH$, $n=3$ to 8) adduct having 1 to 7 ethylene oxide molecules at both ends of the diol; an ethylene oxide/polyhydric alcohol adduct having 1 to 5 ethylene oxide molecules per hydroxy group of the polyhydric alcohol in which the polyhydric alcohol is glycerin, trimethylolpropane, pentaerylthritol, adonitol, sorbitol or inositol; or a mixture thereof.

14. The material according to claim 13, wherein the polyhydric alcohol having a molecular weight of 100 to 2,000 and an ethylene oxide chain is polyethylene glycol, polyoxyethylated glycerin, polyoxyethylated sorbitol or polyoxyethylated adonitol.

* * * * *